United States Patent
Xu et al.

(10) Patent No.: US 10,555,243 B2
(45) Date of Patent: Feb. 4, 2020

(54) DISCOVERY SIGNAL PROCESSING METHOD AND DEVICE

(71) Applicant: ZTE Corporation, Shenzhen (CN)

(72) Inventors: Hanqing Xu, Shenzhen (CN); Yajun Zhao, Shenzhen (CN); Linmei Mo, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 20 days.

(21) Appl. No.: 15/546,855

(22) PCT Filed: Sep. 8, 2015

(86) PCT No.: PCT/CN2015/089193
§ 371 (c)(1),
(2) Date: Jul. 27, 2017

(87) PCT Pub. No.: WO2016/119466
PCT Pub. Date: Aug. 4, 2016

(65) Prior Publication Data
US 2018/0027481 A1 Jan. 25, 2018

(30) Foreign Application Priority Data

Jan. 27, 2015 (CN) .......................... 2015 1 0041892
Apr. 10, 2015 (CN) .......................... 2015 1 0170359

(51) Int. Cl.
*H04W 48/10* (2009.01)
*H04L 5/00* (2006.01)
(Continued)

(52) U.S. Cl.
CPC ........... *H04W 48/10* (2013.01); *H04L 5/0048* (2013.01); *H04W 72/0446* (2013.01);
(Continued)

(58) Field of Classification Search
CPC ............. H04W 48/10; H04W 72/0446; H04W 72/1226; H04W 76/27; H04W 56/001;
(Continued)

(56) References Cited

U.S. PATENT DOCUMENTS

2013/0030149 A1* 1/2013 Rastogi .................. C07K 7/56
530/317
2014/0044105 A1 2/2014 Bontu
(Continued)

FOREIGN PATENT DOCUMENTS

| CN | 102647790 A | 8/2012 |
|---|---|---|
| CN | 104168636 A | 11/2014 |

(Continued)

OTHER PUBLICATIONS

3GPP 3GPP 36.211 v 12.4.0 (Dec. 2014).*
(Continued)

*Primary Examiner* — Jae Y Lee
(74) *Attorney, Agent, or Firm* — Cantor Colburn LLP

(57) ABSTRACT

A Discovery Signal (DS) processing method and device is provided. In the method, at least one of the following operations is executed on each component signal of a DS: determining a configuration manner of each component signal; performing pattern modification on each component signal; and determining a transmission manner of each component signal or each pattern-modified component signal.

12 Claims, 7 Drawing Sheets

(51) Int. Cl.
*H04W 72/04* (2009.01)
*H04W 72/12* (2009.01)
*H04B 7/26* (2006.01)
*H04W 56/00* (2009.01)

(52) U.S. Cl.
CPC ....... *H04W 72/1226* (2013.01); *H04B 7/2656* (2013.01); *H04L 5/0062* (2013.01); *H04W 56/001* (2013.01)

(58) Field of Classification Search
CPC ..... H04L 5/0048; H04L 5/001; H04L 5/0062; H04B 7/2656
See application file for complete search history.

(56) References Cited

U.S. PATENT DOCUMENTS

2016/0043841 A1* 2/2016 Lunttila ................ H04L 5/0092 370/280
2017/0347270 A1* 11/2017 Iouchi .................. H04W 16/14

FOREIGN PATENT DOCUMENTS

| | | |
|---|---|---|
| CN | 104301273 A | 1/2015 |
| CN | 104619027 A | 5/2015 |
| CN | 104796930 A | 7/2015 |
| WO | 2014089069 A1 | 6/2014 |
| WO | 2016039559 A1 | 3/2016 |

OTHER PUBLICATIONS

3GPP 36.211 v 12.4.0, Dec. 2014.*
International Search Report for corresponding application PCT/CN2015/089193 filed on Sep. 8, 2015; dated Dec. 16, 2015.
ETRI: "Required functionalities and possible solution related to SCE operation in unlicensed carrier" 3GPP Draft; R1-144921-LAA Small Cell Operation, vol. RAN WG1 No. San Francisco, 21041117-20141121, Nov. 17, 2014, XP050875975.
European Search Report for corresponding application EP15879664; Report dated Jan. 19, 2018.
LG Electronics, "Measurement and Synchronization in LAA", 3GPP Draft, R1-144903, 3rd Generation, Partnership Project, vol. RAN WG1, No. San Francisco, US, Nov. 17, 2014-Nov. 21, 2014, Nov. 17, 2014, XP050875959.
Motorola Mobility,"Physical Layer Options for LAA-LTE", 3GPP Draft, R1-145123, vol. RAN WG1, No. San Francisco, US, Nov. 17, 2014-Nov. 21, 2014, Nov. 17, 2014, XP050876150.

* cited by examiner

Execute at least one of the following operations on each component signal of a DS: determining a configuration manner of each component signal; performing pattern modification on each component signal; and determining a transmission manner of each component signal or each pattern-modified component signal — S102
Fig. 1
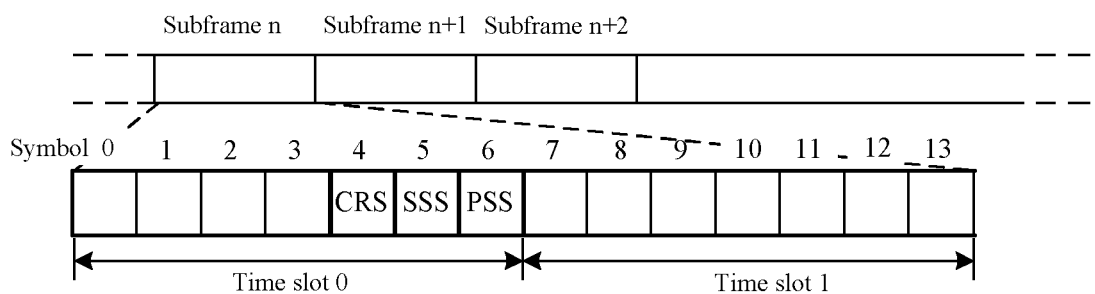
Fig. 2
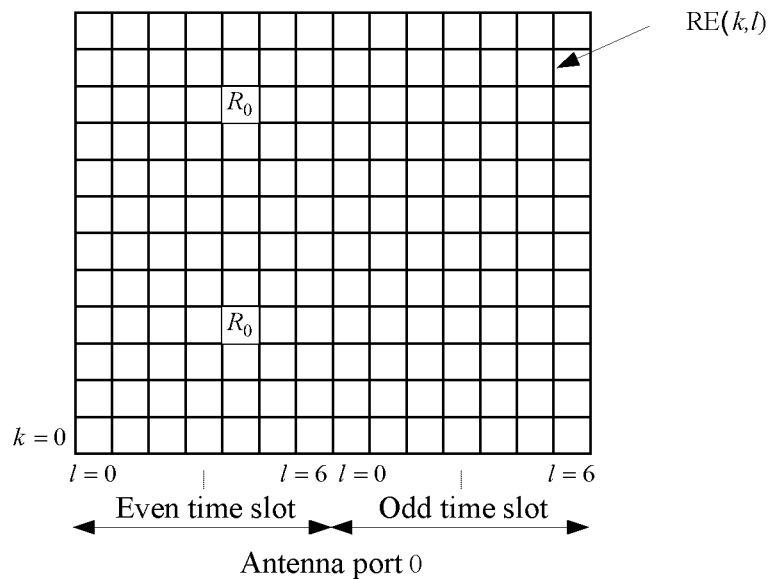
Fig. 3

Processing component
10

DISCOVERY SIGNAL PROCESSING METHOD AND DEVICE

TECHNICAL FIELD

The present disclosure relates to the field of communications, and in particular to a Discovery Signal (DS) processing method and device.

BACKGROUND

Long Term Evolution-Unlicensed (LTE-U) refers to deployment of LTE in an unlicensed carrier for meeting increasing capacity requirements of a wireless communication system and improving a use efficiency of an unlicensed spectrum, and is a possible important evolution direction of LTE and future wireless communications. During design of the LTE-U, it is necessary to consider how to fairly and friendly contend, with inter-systems such as a Wireless Fidelity (WiFi) and a radar and LTE-U intra-systems, for an unlicensed spectrum to perform data transmission. And it is also necessary to avoid influencing and retaining LTE technical characteristics as far as possible. According to an expression of a $3^{rd}$ Generation Partnership Project (3GPP) standard session, an LTE-U system is also referred to as an LTE Licensed Assisted Access (LAA) system.

A communication system using an unlicensed carrier avoids using an unlicensed carrier that is currently used by an existing station in unlicensed carriers, and otherwise, inter-system interference will be caused. Therefore, in some countries (e.g., Europe and Japan), unlicensed carriers are forcedly required to support a Listen before Talk (LBT) function. Before a certain unlicensed carrier is used, it is necessary to execute a Clear Channel Assessment (CCA) function. If it is discovered that a certain device is using the unlicensed carrier or it is detected that signal energy exceeds a CCA threshold, an access is delayed. And if it is discovered that a channel is clear or it is detected that the signal energy is lower than the CCA threshold, the unlicensed carrier is occupied.

Therefore, LBT or CCA will limit from transmitting an LAA reference signal before occupying an unlicensed carrier. According to stipulations of the EN 301 893 of an European Telecommunications Standards Institute (ETSI), a control frame (e.g., Acknowledgment/Negative Acknowledgement (ACK/NACK) signal) is transmitted and managed by utilizing a Short Control Signaling (SCS). And moreover, it is unnecessary to perceive that a current channel is clear. That is, it is unnecessary to execute the LBT/CCA before transmission. However, transmission of the SCS is strictly limited as follows: if the SCS is used, a maximum short message transmission duty ratio of an adaptive device does not exceed 5% within an observation period of 50 ms, i.e., 2.5 ms.

To use the unlicensed carrier, it is likewise necessary to solve problems of cell discovery, synchronization, Radio Resource Management (RRM) and the like, and a DS specified by a 3GPP Rel-12 is serving as a research reference.

Components of the DS defined by a Rel-12 at present are: a Primary/Secondary Synchronization Signal (PSS/SSS), a Cell-specific Reference Signal (CRS), and a Channel State Information-Reference Signal (CSI-RS), which are configurable. DS duration within each period under a Frequency Division Duplex (FDD) mode includes one to five successive subframes. DS duration within each period under a Time Division Duplex (TDD) mode includes two to five successive subframes.

In each component signal, a CRS is transmitted on all downlink subframes and a Downlink part of the special subframe (DwPTS) through an antenna port 0. A PSS is transmitted on a first subframe within each period of FDD or a second subframe within each period of TDD. An SSS is transmitted on a first subframe within each period, and a non-zero-power CSI-RS is transmitted on zero or more subframes within each period.

According to the related art, it is discovered as follows (actually, a Resource Element (RE) position or pattern of each component signal of the DS are consistent with an RE position or pattern of each independent signal before the Rel-12).

For FDD, an existing DS duration includes at least one subframe. In the at least one subframe, a CRS occupies a symbol 0, a symbol 4, a symbol 7 and a symbol 11, an SSS occupies a symbol 5, a PSS occupies a symbol 6, and a CSI-RS is configurable. If the CSI-RS is not configured, the DS crosses at least 12 symbols, and actually occupies at least six symbols.

For TDD, an existing DS duration includes at least two subframes. In the at least two subframes, a CRS occupies symbols 0, symbols 4, symbols 7 and symbols 11 in the first subframe and the second subframe, an SSS occupies a symbol 13 in the first subframe, a PSS occupies a symbol 2 in the second subframe, and a CSI-RS is configurable. If the CSI-RS is not configured, the DS crosses at least 26 symbols, and actually occupies at least 10 symbols.

Use of the unlicensed carrier is special. Limitations of necessity in execution of an LBT or CCA mechanism and maximum occupancy duration exist before the unlicensed carrier is used. Internal multi-symbol non-successive transmission of the DS involves a problem of repeated occupation (if symbol-based transmission) or over-long occupation time (the whole DS duration is reserved once and it is necessary to transmit an occupied or reversed signal). And it is required to re-design a pattern of a DS so as to reduce the number of times of occupation or to shorten occupancy duration.

The SCS has a strict time requirement for an SCS transmission manner without LBT or CCA in a European region. That is, a maximum short message transmission duty ratio of an adaptive device does not exceed 5% within an observation period of 50 ms, i.e., 2.5 ms. It is also required to shorten the occupancy duration of the DS, and moreover, internal multi-symbol non-successive transmission of the DS will cause multi-interference to a user who is contending for resources or has occupied the resources. Therefore, it is also necessary to re-design a pattern of the DS so as to shorten the occupancy duration, multi-interference to other devices is avoided, and some SCS resources are taken for transmitting other necessary short signaling.

To sum up, it is necessary to re-design an Unlicensed Carrier-Discovery Signal (UCDS) in the related art. On a premise of meeting and matching special requirements for use of an unlicensed carrier, occupation of DS resources is minimized, and a problem of multi-interference is avoided.

SUMMARY

At least some embodiments of the present disclosure provide a DS processing method and device, so as at least to partially solve a problem in the related art where there are many problems about application of a DS to an unlicensed carrier and it is necessary to re-design the DS.

In an embodiment of the present disclosure, a DS processing method is provided, which includes that: executing at least one of the following operations on each component signal of a DS: determining a configuration manner of each component signal; performing pattern modification on each component signal; and determining a transmission manner of each component signal or each pattern-modified component signal.

In one embodiment, performing the pattern modification on each component signal includes: selecting and retaining, according to an existing time-frequency resource position of each component signal, symbols, adjacent or close to each other in a time domain, in each component signal to form a Unlicensed Carrier-Discovery Signal (UCDS) and transmitting the UCDS; or, modifying a time-frequency resource position of each component signal to make a position of each component signal adjacent or close in a time domain, using modified symbols to form a UCDS, and transmitting the UCDS.

In one embodiment, modifying the time-frequency resource position of each component signal includes: modifying a time domain position of each component signal.

In one embodiment, the UCDS includes at least one of the following: a Primary Synchronization Signal (PSS); a Secondary Synchronization Signal (SSS); a Cell-specific Reference Signal (CRS); a Channel State Information-Reference Signal (CSI-RS); and a Position Reference Signal (PRS), and the PSS, the SSS, the CRS and the PRS are used for at least one of cell discovery and synchronization, and the CRS and the CSI-RS are used for at least one of Radio Resource Management (RRM) measurement and CSI measurement.

In one embodiment, the UCDS includes a modification form of a single signal in the PSS, the SSS, the CRS, the PRS, the CRS and the CSI-RS or a combination of modification forms of at least two signals in the PSS, the SSS, the CRS, the PRS, the CRS and the CSI-RS.

In one embodiment, when the UCDS configured with CSI-RS, a time domain position of the CSI-RS is defined in a preset position.

In one embodiment, the CSI-RS is not transmitted in a time domain position of PSS or SSS in the UCDS.

In one embodiment, configuration corresponding to a symbol signal occupied by the CSI-RS adjacent or close to signal positions occupied by other component signals other than the CSI-RS in a 3GPP 36.211 Release 12 Table 6.10.5.2-1 is reserved.

In one embodiment, the CSI-RS in the UCDS is transmitted by configuration corresponding to symbol 9 and symbol 10 in a 3GPP 36.211 Release 12 Table 6.10.5.2-1 is reserved.

In one embodiment, the transmission manner includes one of the following: periodic transmission; non-periodic trigger transmission; and hybrid manner transmission of the periodic transmission and the non-periodic trigger transmission.

In one embodiment, the transmission manner further includes: switching between a traditional DS transmission mode of each component signal and a UCDS transmission mode of each pattern-modified component signal.

In one embodiment, the periodic transmission includes one of the following: transmitting a UCDS at each period point through a Short Control Signaling (SCS); when an unlicensed carrier is obtained by contention, normally transmitting the UCDS at a current period point, when the unlicensed carrier is not obtained by contention, stopping transmitting the UCDS once at the current period point, waiting for a next period point, and when the unlicensed carrier has not been obtained by contention yet at the next period point, continuously stopping transmitting the UCDS once; and when an unlicensed carrier is obtained by contention, normally transmitting the UCDS at a current period point, when the unlicensed carrier is not obtained by contention, stopping transmitting the UCDS once at the current period point, and after the unlicensed carrier is obtained by contention next time, complementarily transmitting the UCDS, and complementary transmission of the UCDS is irregular periodic transmission.

In one embodiment, the periodic transmission includes one of the following: transmitting the UCDS by means of Listen before Talk (LBT) or Clear Channel Assessment (CCA) according to a preset transmission parameter set, and the preset transmission parameter set includes at least one of the following: a period, an offset, a duration and a burst; and when an unlicensed carrier is obtained by contention, transmitting the UCDS at a current period point, when the unlicensed carrier is not obtained by contention, stopping transmitting the UCDS once at the current period point, and when an unlicensed carrier is re-obtained by contention within a time period before a next period point, continuously transmitting the UCDS, and continuous transmission of the UCDS is irregular periodic transmission, the next period point is after the current period point, the current period point and the next period point are determined by a preset transmission parameter set, and the preset transmission parameter set includes at least one of the following: a period, an offset, a duration and a burst.

In one embodiment, a transmission policy of the UCDS includes one of the following: shortening a transmission period of the UCDS; increasing a transmission opportunity of the UCDS by using a transmission window, and a design manner of the transmission window includes one of the following: the transmission window is before a preset time point, the transmission window is after the preset time point, the transmission window contains the preset time point, the preset time point is determined by a preset transmission parameter set, and the preset transmission parameter set includes at least one of the following: a period, an offset, a duration and a burst; and cooperatively transmitting the UCDS by using a first period and a second period, and the first period is greater than the second period, and the UCDS is complementarily transmitted within the second period when the UCDS is not successfully transmitted within the first period.

In one embodiment, when the transmission opportunity of the UCDS is increased by using the transmission window, the transmission window is determined by a base station and transmitted to a terminal by the base station; or, when the UCDS is cooperatively transmitted by using the first period and the second period, the first period and the second period are determined by a base station and transmitted to a terminal by the base station.

In one embodiment, the non-periodic trigger transmission includes: informing, by means of a licensed carrier or an unlicensed carrier, a User Equipment (UE) and a Secondary Cell (SCell) corresponding to the UE of whether to transmit at least one of the UCDS and configuration information of the UCDS.

In one embodiment, a trigger signal for triggering the SCell to transmit the UCDS is transmitted in a cable or radio manner between different cells.

In one embodiment, by means of a Radio Resource Control (RRC) signaling, a Media Access Control (MAC)

signaling or a physical layer signaling, the UE is informed of whether the SCell transmits at least one of the UCDS and the configuration information of the UCDS.

In one embodiment, a time-frequency resource position of at least one of the trigger signal for triggering the SCell to transmit the UCDS and a signaling for informing the UE of whether the SCell transmits the UCDS is pre-configured or dynamically selected.

In one embodiment, the configuration manner includes one of the following: an independent configuration manner and a combined configuration manner.

In one embodiment, when each component signal adopts the independent configuration manner, each component signal is independently configured with at least one of a period, an offset, duration, a subframe position, a time-frequency pattern, and a burst.

In one embodiment, periods of all the component signals are defined by a preset relation.

In one embodiment, subframe positions of all the component signals are defined by a preset relation.

In one embodiment, each component signal is configured with at least one of a unified period, offset, duration and burst, each component signal having at least one of different subframe positions and time-frequency configurations.

In one embodiment, a UCDS subframe is at least one of a periodic subframe and a non-periodic subframe, and the UCDS subframe is a UCDS transmitting subframe or a subframe that the UE supposes existence of the UCDS.

In one embodiment, the UCDS satisfies a single-shot RRM measurement performance of a Licensed Assisted Access (LAA).

In one embodiment, a condition that the UCDS satisfies the single-shot RRM measurement performance of the LAA includes one of the following: transmitting at least one UCDS bursts within a UCDS transmitting period, and a plurality of UCDS bursts are transmitted in a successive manner or a non-successive repeated manner on a time domain; and transmitting a measurement signal or symbol on non-successive symbols in the UCDS.

In another embodiment of the present disclosure, a DS processing device is provided, which includes: a processing component, configured to execute at least one of the following operations on each component signal of a DS: determining a configuration manner of each component signal; performing pattern modification on each component signal; and determining a transmission manner of each component signal or each pattern-modified component signal.

In one embodiment, the processing component is configured to select and retain, according to an existing time-frequency resource position of each component signal of the DS, symbols, adjacent or close to each other in a time domain, in each component signal to form a Unlicensed Carrier-Discovery Signal (UCDS) and transmit the UCDS; or, modify a time-frequency resource position of each component signal to make a position of each component signal adjacent or close in a time domain, use modified symbols to form a UCDS, and transmit the UCDS.

In one embodiment, the processing component is configured to modify a time domain position of each component signal.

In one embodiment, the UCDS includes at least one of the following: a Primary Synchronization Signal (PSS); a Secondary Synchronization Signal (SSS); a Cell-specific Reference Signal (CRS); a Channel State Information-Reference Signal (CSI-RS); and a Position Reference Signal (PRS), and the PSS, the SSS, the CRS and the PRS are used for at least one of cell discovery and synchronization, and the CRS and the CSI-RS are used for at least one of Radio Resource Management (RRM) measurement and CSI measurement.

In one embodiment, the UCDS includes a modification form of a single signal in the PSS, the SSS, the CRS, the PRS, the CRS and the CSI-RS or a combination of modification forms of at least two signals in the PSS, the SSS, the CRS, the PRS, the CRS and the CSI-RS.

In one embodiment, the transmission manner includes one of the following: periodic transmission; non-periodic trigger transmission; and hybrid manner transmission of the periodic transmission and the non-periodic trigger transmission.

In one embodiment, the transmission manner further includes: switching between a traditional DS transmission mode of each component signal and a UCDS transmission mode of each pattern-modified component signal.

In one embodiment, the periodic transmission includes one of the following: transmitting a UCDS at each period point through a Short Control Signaling (SCS); when an unlicensed carrier is obtained by contention, normally transmitting the UCDS at a current period point, when the unlicensed carrier is not obtained by contention, stopping transmitting the UCDS once at the current period point, waiting for a next period point, and if the unlicensed carrier has not been obtained by contention yet at the next period point, continuously stopping transmitting the UCDS once; and when an unlicensed carrier is obtained by contention, normally transmitting the UCDS at a current period point, when the unlicensed carrier is not obtained by contention, stopping transmitting the UCDS once at the current period point, and after the unlicensed carrier is obtained by contention next time, complementarily transmitting the UCDS, and complementary transmission of the UCDS is irregular periodic transmission.

In one embodiment, the non-periodic trigger transmission includes: informing, by means of a licensed carrier or an unlicensed carrier, a User Equipment (UE) and a Secondary Cell (SCell) corresponding to the UE of whether to transmit at least one of the UCDS and configuration information of the UCDS.

In one embodiment, the periodic transmission includes one of the following: transmitting the UCDS by means of Listen before Talk (LBT) or Clear Channel Assessment (CCA) according to a preset transmission parameter set, and the preset transmission parameter set includes at least one of the following: a period, an offset, a duration and a burst; and when an unlicensed carrier is obtained by contention, transmitting the UCDS at a current period point, when the unlicensed carrier is not obtained by contention, stopping transmitting the UCDS once at the current period point, and when an unlicensed carrier is re-obtained by contention within a time period before a next period point, continuously transmitting the UCDS, and continuous transmission of the UCDS is irregular periodic transmission, the next period point is after the current period point, the current period point and the next period point are determined by a preset transmission parameter set, and the preset transmission parameter set includes at least one of the following: a period, an offset, a duration and a burst.

In one embodiment, a transmission policy of the UCDS includes one of the following: shortening a transmission period of the UCDS; increasing a transmission opportunity of the UCDS by using a transmission window, and a design manner of the transmission window includes one of the following: the transmission window is before a preset time point, the transmission window is after the preset time point, the transmission window contains the preset time point, the preset time point is determined by a preset transmission parameter set, and the preset transmission parameter set includes at least one of the following: a period, an offset, a duration and a burst; and cooperatively transmitting the UCDS by using a first period and a second period, and the first period is greater than the second period, and the UCDS is complementarily transmitted within the second period when the UCDS is not successfully transmitted within the first period.

In one embodiment, when the transmission opportunity of the UCDS is increased by using the transmission window, the transmission window is determined by a base station and transmitted to a terminal by the base station; or, when the UCDS is cooperatively transmitted by using the first period and the second period, the first period and the second period are determined by a base station and transmitted to a terminal by the base station.

In one embodiment, a trigger signal for triggering the SCell to transmit the UCDS is transmitted in a cable or radio manner between different cells.

In one embodiment, by means of a Radio Resource Control (RRC) signaling, a Media Access Control (MAC) signaling or a physical layer signaling, the UE is informed of whether the SCell transmits at least one of the UCDS and transmits the configuration information of the UCDS.

In one embodiment, a time-frequency resource position of at least one of the trigger signal for triggering the SCell to transmit the UCDS and a signaling for informing the UE of whether the SCell transmits the UCDS is pre-configured or dynamically selected.

In one embodiment, the configuration manner includes one of the following: an independent configuration manner and a combined configuration manner.

In one embodiment, when each component signal adopts the independent configuration manner, each component signal is independently configured with at least one of a period, an offset, a duration, a subframe position a time-frequency pattern, and a burst.

In one embodiment, periods of all the component signals are defined by a preset relation.

In one embodiment, subframe positions of all the component signals are defined by a preset relation.

In one embodiment, each component signal is configured with a unified period, offset and duration, each component signal having at least one of different subframe positions and time-frequency configurations.

In one embodiment, a UCDS subframe is at least one of a periodic subframe and a non-periodic subframe, and the UCDS subframe is a UCDS transmitting subframe or a subframe that the UE supposes existence of the UCDS.

In one embodiment, the UCDS satisfies a single-shot RRM measurement performance of a Licensed Assisted Access (LAA).

In one embodiment, a condition that the UCDS satisfies the single-shot RRM measurement performance of the LAA includes one of the following: transmitting at least two UCDS occasions or UCDS bursts within a UCDS transmitting period, the at least two UCDS occasions or UCDS bursts being transmitted in a successive manner or a non-successive repeated manner on a time domain; and transmitting a measurement signal/symbol on non-successive symbols in the UCDS formed by the modified symbols.

By means of at least some embodiments of the present disclosure, at least one of the following operations is executed on each component signal of a DS: determining a configuration manner of each component signal; performing pattern modification on each component signal; and determining a transmission manner of each component signal or each pattern-modified component signal. The problem in the related art where there are many problems about application of a DS to an unlicensed carrier and it is necessary to re-design the DS are solved, an occupancy duration is shortened, and multi-interference to other devices is avoided.

BRIEF DESCRIPTION OF THE DRAWINGS

The drawings described herein are adopted to provide further understanding of the present disclosure, and form a part of the present application. The schematic embodiments and description of the present disclosure are adopted to explain the present disclosure, and do not form improper limits to the present disclosure. In the drawings:

FIG. 1 is a flowchart of a DS processing method according to an embodiment of the present disclosure.

FIG. 2 is a position diagram of each signal of a UCDS in a time domain in Method One according to a first exemplary embodiment of the present disclosure.

FIG. 3 is an RE position diagram of a CRS in Method One according to a first exemplary embodiment of the present disclosure.

DETAILED DESCRIPTION

Figure 4:
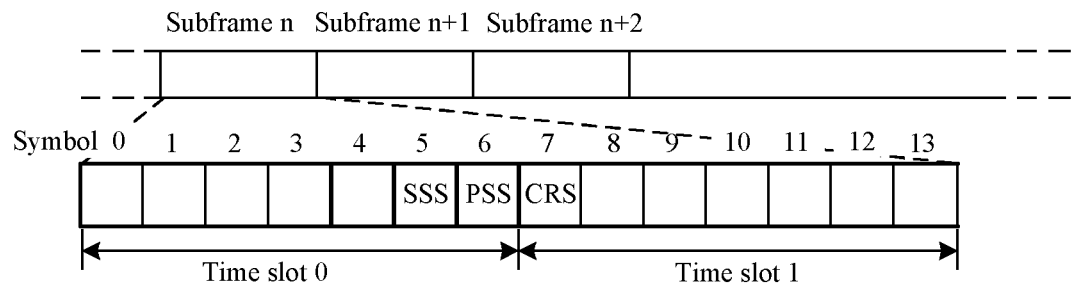
FIG. 4 is a position diagram of each signal of a UCDS in a time domain in Method Two according to a first exemplary embodiment of the present disclosure.

The present disclosure will be illustrated herein below with reference to the drawings and in conjunction with the embodiments in detail. It is important to note that embodiments in the present application and features in the embodiments are combined under the condition of no conflicts.

FIG. 1 is a flowchart of a DS processing method according to an embodiment of the present disclosure. As shown in FIG. 1, the method includes the following processing steps.

At Step S102, at least one of the following operations is executed on each component signal of a DS: determining a configuration manner of each component signal; performing pattern modification on each component signal; and determining a transmission manner of each component signal or each pattern-modified component signal.

The related art has the problem where there are many problems about application of a DS to an unlicensed carrier and it is necessary to re-design the DS. By means of the method as shown in FIG. 1, at least one of the configuration manner, design manner and transmission manner of each component signal of the DS is processed. Thus, the problem in the related art where there are many problems about application of a DS to an unlicensed carrier and it is necessary to re-design the DS are solved, an occupancy duration is shortened, and multi-interference to other devices is avoided.

In an exemplary embodiment, in Step S102, performing the pattern modification on each component signal includes one of the following operations.

Operation One: selecting and retaining, according to an existing time-frequency resource position of each component signal, symbols, adjacent or close to each other in a time domain, in each component signal to form a UCDS and transmitting the UCDS.

Operation Two: modifying a time-frequency resource position of each component signal to make the position of each component signal adjacent or close in a time domain, using modified symbols to forming a UCDS, and transmitting the UCDS.

In an exemplary embodiment, the DS has the following two design manners.

Manner One, according to an existing time-frequency resource position of each component signal of the DS, symbols, adjacent or close to each other in a time domain, in each component signal are selected and retained to form a UCDS to be transmitted.

For example, an existing DS duration is one subframe (FDD mode). In the subframe, a CRS occupies a symbol 0, a symbol 4, a symbol 7 and a symbol 11, an SSS occupies a symbol 5, a PSS occupies a symbol 6, and a CSI-RS is configurable. If the CSI-RS is not configured, a DS crosses at least 12 symbols, and actually occupies at least six symbols.

The CRS is selected to be transmitted on the symbol 4, and the CRS is not transmitted on the symbol 0, the symbol 7 and the symbol 11. The SSS still occupies the symbol 5, and the PSS occupies the symbol 6. Therefore, the UCDS here consists of the CRS and the PSS/SSS, and occupies the symbol 4, the symbol 5 and the symbol 6. The DS crosses three symbols, and actually occupies the three symbols.

It is important to note that this manner selects and retains time domain positions of the component signals without change or movement to transmit close signals there among, and is advantageous in: being compatible with the related art and being slightly changed.

Manner Two, a time-frequency resource position, particularly a time domain position, of each component signal is modified to make the position of each component signal adjacent or close in a time domain. A UCDS is formed by modified symbols and then transmitted.

For example, an existing DS duration is one subframe (FDD mode). In the subframe, a CRS occupies a symbol 0, a symbol 4, a symbol 7 and a symbol 11, an SSS occupies a symbol 5, a PSS occupies a symbol 6, and a CSI-RS is configurable. If the CSI-RS is not configured, a DS crosses at least 12 symbols, and actually occupies at least six symbols.

The CRS is selected to be transmitted on the symbol 7, and the CRS is not transmitted on the symbol 0, the symbol 4 and the symbol 11. The SSS and the PSS are switched to be transmitted on a symbol 8 and a symbol 9 respectively. Therefore, the UCDS occupies the symbol 7, the symbol 8 and the symbol 9.

Herein, there are other selection methods likewise. For example, the time domain positions of the SSS and the PSS are unchanged, and the time domain position of the CRS is changed. For example, the CRS is transmitted on a symbol 3, the symbol 4, the symbol 7 and the symbol 8. That is, the symbol positions of the UCDS are the symbol 3, the symbol 4, the symbol 5, the symbol 6, the symbol 7 and the symbol 8.

Or, time domain patterns of UCDS component signals such as the CRS, the PSS, the SSS and the CSI-RS is modified on an existing format, such that the position of each component signal is adjacent or close in a time domain. The CRS or CSI-RS in the UCDS is successively transmitted before the PSS/SSS or successively transmitted after the PSS/SSS, and when the PSS and SSS symbols are not adjacent, the CRS or CSI-RS is successively transmitted between the PSS and the SSS.

Modification of frequency domain resources is mainly applied to a scenario where signals in a UCDS occupy the same symbol, and the signals are staggered on the frequency domain resources. The advantages of Manner Two are that all symbols of the UCDS are successively or closely transmitted, the flexibility is better, and the number of symbols occupied by each component signal can be controlled.

The modification of frequency domain resources involves the problem where use of an unlicensed carrier is to occupy 80% of a nominal bandwidth. For example, a synchronization signal PSS/SSS occupies six RBs in the middle of a frequency domain. Even if a base station can contend for a right of use of the unlicensed carrier to transmit the synchronization signal, the right of use is probably preempted by other devices or base stations. Therefore, at least one of the PSS and the SSS is repeatedly transmitted on the frequency domain.

Compared with Manner Two, Manner One cannot guarantee that the positions of the symbols occupied by all the signals in the UCDS are adjacent or close sometimes, and the number of the symbols occupied by the signals in Manner One will be limited.

For a usage scenario of the unlicensed carrier, if there is not an SCS and similar rules, the UCDS is transmitted by using an LBT/CCA mechanism. If a channel is busy, it cannot be ensured that the UCDS is normally transmitted, that is, the UCDS is not transmitted for a long time probably. In this case, an RRM measurement performance and a synchronization performance cannot be maintained. So, it is best for the UCDS to satisfy the single-shot RRM measurement performance of an LAA.

A UCDS pattern determined by Manner One or Manner Two has been able to ensure that all symbols of the UCDS are successively (or closely) transmitted. To ensure the single-shot measurement performance of the UCDS, the UCDS is repeatedly and successively transmitted. For example, a transmission period of the UCDS is 80 ms (or not periodically transmitted), a UCDS occasion (or referred to as burst) exists within a period, a duration of the UCDS occasion is 1 ms, and all symbols in the UCDS, namely in a 1 ms pattern, are successive in the time domain.

To satisfy the single-shot measurement performance, two or more UCDS occasions (or bursts) are transmitted within a UCDS transmission period. These occasions (or bursts) being successive in the time domain preferably (not excluding a possibility of non-successive repeated transmission). For example, within 80 ms, the UCDS is transmitted within 2 ms, the 2 ms being successive in the time domain. The 2 ms is referred to as two UCDS bursts or two UCDS occasions, and certainly, multiple UCDS occasions that are repeatedly transmitted and successive in the time domain are collectively referred to as one UCDS occasion.

Or, to satisfy the single-shot measurement performance of the UCDS, Manner Two is adopted to modify a transmission pattern of a known signal and transmit a measurement signal/symbol on non-successive symbols in a DS. For example, an existing licensed carrier DS duration is one subframe (FDD mode). In the subframe, a CRS occupies a symbol 0, a symbol 4, a symbol 7 and a symbol 11, an SSS occupies a symbol 5, a PSS occupies a symbol 6, and a CSI-RS is configurable. In addition, at least one measurement signal CRS and CSI-RS is transmitted on idle symbols such as a symbol 1, a symbol 2, a symbol 3, a symbol 8, a symbol 9 and a symbol 10. The modified pattern of the existing DS is a UCDS pattern, and this manner not only can ensure that all symbols in the UCDS are successively transmitted in the time domain, but also can ensure the single-shot measurement performance of a CDS.

In order not to influence mapping of data or a Physical Downlink Shared Channel (PDSCH) during data transmission, it is unnecessary to ensure successive transmission of the UCDS by modifying non-successive symbols in a UCDS subframe according to the two manners or filling the non-successive symbols in the UCDS subframe with a measurement signal or symbol.

In case of no data transmission, the non-successive symbols in the UCDS subframe are modified according to the two manners or filled with the measurement signal or symbol so as to satisfy or enhance the measurement performance.

In case of data transmission, the non-successive symbols in the UCDS subframe are modified according to the two manners or filled with the measurement signal or symbol so as to satisfy or enhance the measurement performance. Transmission is performed according to an original manner of each signal in the UCDS subframe, the non-successive symbols therein are not modified or filled, successive time-domain transmission is ensured by utilizing data mapping, and meanwhile, data transmission is not influenced.

In addition, for some special scenarios such as a scenario where unlicensed carrier devices (e.g., LAA or WIFI) are sparsely deployed, when unlicensed carrier resources are easily preempted and interference to other stations is omitted, no matter whether an LAA station transmits a DS through LBT or CCA or directly transmits the DS through an SCS, the problems of occupancy duration of the DS, repeated preempting, multi-interference and the like will be weakened. In this case, a traditional DS can be used. The effects of discovery, synchronization and measurement by utilizing the traditional DS will be better.

For different scenarios, two transmission mode switching mechanisms for a DS are introduced. Two transmission modes of the DS include a Rel-12 DS transmission mode and a UCDS transmission mode. A licensed carrier cell such as at least one of a PCell and an unlicensed carrier cell (e.g., unlicensed carrier access point or other access points) is to transmit the transmission modes of at least one of the DS and configuration information corresponding to the DS to at least one of an access point and a UE before the access point transmits the DS.

In an exemplary embodiment, the UCDS includes, but not limited to, at least one of the following:
  (1) a PSS;
  (2) an SSS;
  (3) a CRS;
  (4) a CSI-RS; and
  (5) a PRS,
  and the PSS, the SSS, the CRS and the PRS are used for at least one of cell discovery and synchronization, and the CRS and the CSI-RS are used for at least one of RRM measurement and CSI measurement.

It is important to note that the component signals of the UCDS not only includes at least one of the above-mentioned signals, but also includes modification forms of the above-mentioned signals.

In an exemplary embodiment, the transmission manner includes, but not limited to, one of the following manners.

Manner One: periodic transmission, where the UCDS is transmitted according to a preset fixed period, offset, duration and burst.

Manner One is also divided into the following three manners.

(1) A UCDS is transmitted at each period point through an SCS no matter whether the period point has been occupied.

It is important to note that the SCS involved in the present disclosure not only refers to an SCS specified in the ETSI, but also generally refers to a function of directly transmitting a short time signal and channel without execution of CCA and LBT. The signal and the channel are transmitted within SCS duration, and the LAA access point does not execute functions of CCA and LBT, so it is best for SCS transmission duration to meet a certain control requirement in order to ensure friendly coexistence of different systems and devices with unlicensed bands. The SCS has another names and definitions in some regions and countries, and is collectively referred to as the SCS herein. Some regions and countries do not define the SCS. The SCS and similar rule requirements (e.g., a transmission duration within an observation period of a fixed duration is required not to be greater than a set proportion) are defined for these regions and countries to perform non-occupation period signal transmission.

(2) If an unlicensed carrier is obtained by contention, the UCDS is normally transmitted at the period point. If the unlicensed carrier is not obtained by contention, the UCDS stops being transmitted once at the period point, waits for a next period point, and if a resource has not been obtained by contention yet at the next period point, the UCDS continuously stops being transmitted.

(3) If an unlicensed carrier is obtained by contention, the UCDS is normally transmitted at the period point. If the unlicensed carrier is not obtained by contention, the UCDS stops being transmitted once at the period point, and after the unlicensed carrier is obtained by contention next time, the UCDS is complementarily transmitted. But it is not required to necessarily transmit the UCDS at the period point, that is, complementary transmission is delayed transmission that is irregular periodic transmission actually.

The periodic transmission is to be determined by a licensed carrier (e.g., PCell) or other unlicensed carriers, or informs the SCell and/or UEs of UCDS transmission patterns of the SCells (including at least one of the following: period, offset, duration, port, power and burst), and the UE detects the UCDS according to the determined UCDS transmission pattern or measurement pattern (including at least one of the following: period, offset, duration, port, power and burst).

Manner Two: non-periodic trigger transmission, where the non-periodic trigger transmission of the UCDS is triggered by means of, for example, a PCell.

(1) The non-periodic trigger transmission includes: informing, by means of a licensed carrier such as a PCell or other unlicensed carriers, a UE of whether the SCell transmits at least one of the UCDS and configuration information of the UCDS.

(2) A trigger signal for triggering the SCell to transmit the UCDS is transmitted in a cable or radio manner between cells.

(3) When transmission of the UCDS is triggered, possible component signals of the UCDS have different functions, so transmission of a signal, multiple signals, or all signals of the possible component signals of the UCDS, or modification forms of the signals are triggered.

(4) By means of an RRC signaling, an MAC signaling or a physical layer signaling (e.g., DCI), the UE is informed of whether the SCell transmits at least one of the UCDS and configuration information of the UCDS.

(5) When the SCell is triggered to transmit the UCDS, a neighbor cell is informed of UCDS transmission information of the SCell, thus reducing the measurement influences on the neighbor cell and the present cell.

(6) A time-frequency resource position of at least one of the trigger signal for triggering the SCell to transmit the UCDS and a signaling for informing the UE of whether the SCell transmits the UCDS is pre-configured or dynamically selected. Information such as a set period, subframe, symbol and RE is pre-configured, and at least one of the SCell and the UE is to detect at least one of the trigger signal and the signaling on these pre-configured points. At least one of the SCell and the UE performs blind detection during dynamic selection.

Manner Three: hybrid manner transmission, namely combination of the periodic transmission and the non-periodic trigger transmission. For example, sparse UCDS periodic transmission is performed through an SCS, after the SCell contends for a right of use of an unlicensed carrier, the PCell triggers the SCell to transmit the UCDS on the unlicensed carrier as needed.

During the hybrid manner transmission, it is likewise necessary to determine or inform the information of the above-mentioned two transmission manners. For example, at least one of the UE and the SCell is informed of information that includes a transmission pattern and measurement pattern of the UCDS and indicates whether to transmit the UCDS.

According to the transmission manners, the SCell transmits all component signals of the UCDS, or transmits at least one component signals in the UCDS. The reasons are that: requirements for the component signals of the UCDS are inconsistent due to different demands. For example, UCDSs on which a synchronization demand and an RRM measurement demand depend are different. It is necessary to adjust the UCDS transmission pattern of the SCell (including at least one of the following: period, duration and offset).

Therefore, all the component signals of the UCDS are independently configured, and are, certainly, configured in a combined manner.

If independent configuration is adopted, each component signal of the UCDS is independently configured with a period, an offset, duration, a subframe position, and a time-frequency pattern. All the component signals are restrained.

In an exemplary implementation process, periods of all the signals are defined by a relation. For example, configuration periods of different signals have a multiple relation. F or example, the UCDS includes a PSS, an SSS, a CRS and a CSI-RS, which are independently configurable. A CRS period is a multiple of a PSS/SSS period; or, the PSS/SSS period is a multiple of the CRS period; or, a CSI-RS period is a multiple of the CRS period; or, the CRS period is a multiple of the CSI-RS period; or, the CSI-RS period is a multiple of the PSS/SSS period; or, the PSS/SSS period is a multiple of the CSI-RS period.

In an exemplary implementation process, subframe positions of all the signals are defined by a relation. For example, it is restrained that the CRS is located on a subframe for transmitting the PSS/SSS, or the CRS is located on a subframe for transmitting the CSI-RS, or, the CSI-RS is located on a subframe for transmitting the PSS/SSS.

If the combined configuration is adopted, the UCDS is configured with a unified period, offset, duration, burst and the like. Under the above-mentioned unified configuration, each component signal of the UCDS has at least one of different subframe positions and time-frequency configurations such as subframe, symbol and RE. The period of the UCDS (e.g., including the PSS, the SSS, the CRS, the CSI-RS, and other configurable or non-configurable signals) is configured as 40 ms, 80 ms and 160 ms. The duration is configured as one to five subframes. Within each duration of each period, each component signal of the UCDS has different configurations or subframe information. For example, the PSS/SSS is transmitted once, the CRS is transmitted for many times, the CSI-RS and the PSS/SSS have a subframe or symbol offset relation, and subframe or symbol information of each component signal is provided.

Hereinafter, a UCDS subframe is defined as a UCDS transmitting subframe or a subframe that the UE supposes existence of the UCDS. The UCDS subframe is one, two or more subframes. According to the above-mentioned UCDS transmission manners, the UCDS subframe is a periodic subframe, a non-periodic subframe or a combined subframe.

The exemplary implementation process will be further described below with reference to the following exemplary implementation manners about UCDS transmission.

It is important to note that the following exemplary embodiments emphasize several situations for combined transmission of component signals. Actually, a transmission manner of each component signal of a UCDS in each embodiment is likewise applied to a situation where each component signal independently serves as the UCDS or to a situation where a combination of two, three or more of the signals therein serves as the UCDS. Exemplary Embodiment One is taken as an example. A UCDS includes a PSS, an SSS and a CRS, and a CRS time-frequency domain pattern designed in Exemplary Embodiment One is likewise applied to a scenario where the UCDS includes the CRS.

Meanwhile, the method provided in this embodiment of the present disclosure is not limited to the following exemplary embodiments. Method One in Exemplary Embodiment One is taken as an example. A UCDS includes a PSS, an SSS and a CRS, and a symbol before SSS and PSS symbols transmits the CRS. Actually, two symbols or multiple adjacent or close symbols before the SSS and PSS symbols transmit the CRS. Or, a symbol after the SSS and PSS symbols transmits the CRS (namely Method Two in Exemplary Embodiment One). Or, two symbols or multiple adjacent or close symbols after the SSS and PSS symbols transmit the CRS. Or, an equal or unequal number of symbols before and after the SSS and PSS symbols send the CRS (namely Method Three in Exemplary Embodiment One).

Exemplary Embodiment One

In the exemplary embodiment, a UCDS includes a PSS, an SSS and a CRS. The PSS and the SSS are transmitted on adjacent symbols, and a CSI-RS is not configured to be transmitted. The exemplary embodiment includes the following methods.

Method One:

The SSS and the PSS are transmitted on a symbol 5 and a symbol 6 in a first subframe among UCDS subframes or a certain offset subframe. The CRS is transmitted on a symbol 4 in the UCDS subframes. That is, UCDS transmission symbols are the symbol 4, the symbol 5 and the symbol 6.

The CRS is transmitted or repeatedly transmitted in all downlink subframes or the UCDS subframes. The SSS and the PSS are transmitted once within a duration of the UCDS. For example, the duration of the UCDS within a UCDS period is two subframes, or two subframes trigger to transmit the UCDS once, and the UCDS transmission symbols are: the symbol 4, the symbol 5 and the symbol 6 in the first subframe, and a symbol 4 in a second subframe. Or, the PSS/SSS offsets a subframe, namely the symbol 4 in the first subframe, and the symbol 4, a symbol 5 and a symbol 6 in the second subframe.

FIG. 2 is a position diagram of each signal of a UCDS in a time domain in Method One according to an exemplary embodiment of the present disclosure. FIG. 2 shows a transmission situation of the UCDS in a time domain.

FIG. 3 is an RE position diagram of a CRS in Method One according to an exemplary Embodiment of the present disclosure. FIG. 3 shows a time-frequency domain position of the CRS in a subframe. The frequency domain position is offset. For example, in FIG. 3, an RE (k,l) for transmitting the CRS is (3,4) and (9,4), where k is a frequency domain number of the RE, l is a time domain number of the RE, and the value of l ranges from 0 to 13 if ranking according to subframe symbols. Certainly, three REs are offset in a frequency domain, namely (0,4) and (6,4). In addition, one, two or more REs are offset in the frequency domain.

Method Two:

The SSS and the PSS are transmitted on a symbol 5 and a symbol 6 in a first subframe among UCDS subframes or a certain offset subframe. The CRS is transmitted on a symbol 7 in the UCDS subframes (or referred to as a symbol 0 of a second time slot, similarly hereinafter). That is, UCDS transmission symbols are the symbol 5, the symbol 6 and the symbol 7.

The CRS is transmitted or repeatedly transmitted in all downlink subframes or the UCDS subframes. The SSS and the PSS are transmitted once within a duration of the UCDS. For example, the duration of the UCDS within a UCDS period is two subframes, or two subframes trigger to transmit the UCDS once, and the UCDS transmission symbols are: the symbol 5, the symbol 6 and the symbol 7 in the first subframe, and a symbol 7 in a second subframe. Or, the PSS/SSS offsets a subframe, namely the symbol 7 in the first subframe, and a symbol 5, a symbol 6 and the symbol 7 in the second subframe.

FIG. 4 is a position diagram of each signal of a UCDS in a time domain in Method Two according to a first exemplary Embodiment of the present disclosure. FIG. 4 shows a transmission situation of the UCDS in a time domain.

Figure 5:
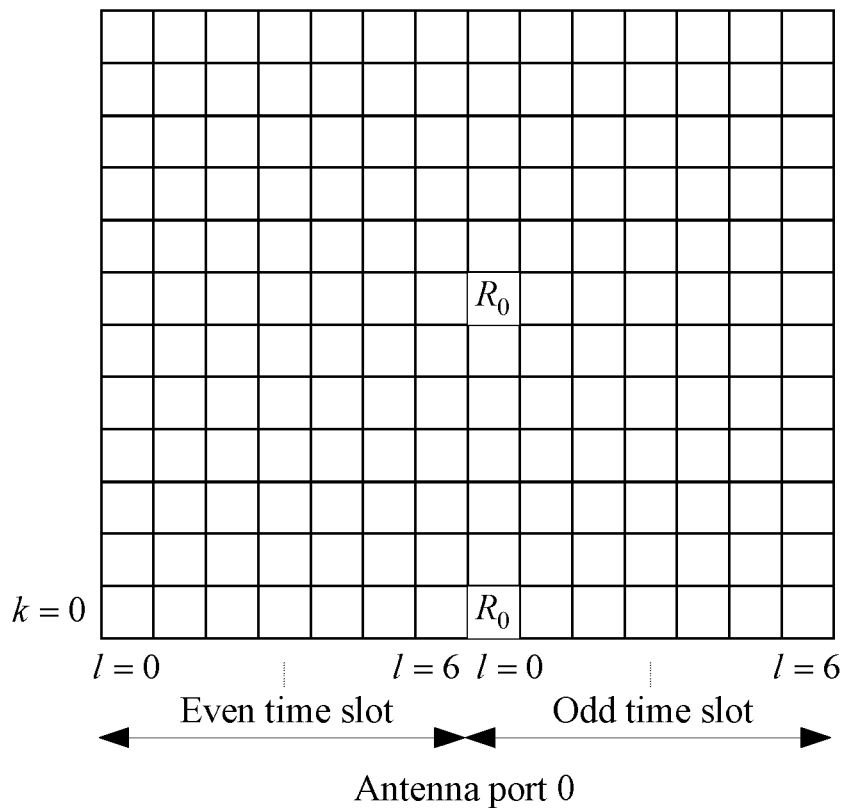
FIG. 5 is an RE position diagram of a CRS in Method Two according to a first exemplary embodiment of the present disclosure.

FIG. 5 is an RE position diagram of a CRS in Method Two according to a first exemplary Embodiment of the present disclosure. FIG. 5 shows a time-frequency domain position of the CRS in a subframe. The frequency domain position is offset. For example, in FIG. 5, an RE (k,l) for transmitting the CRS is (0,7) and (6,7). Certainly, three REs are offset in a frequency domain, namely (3,7) and (9,7). In addition, one, two or more REs are offset in the frequency domain.

Method Three:

The SSS and the PSS are transmitted on a symbol 5 and a symbol 6 in a first subframe among UCDS subframes or a certain offset subframe. The CRS is transmitted on a symbol 4 and a symbol 7 in the UCDS subframes. That is, UCDS transmission symbols are the symbol 4, the symbol 5, the symbol 6 and the symbol 7.

The CRS is transmitted or repeatedly transmitted in all downlink subframes or the UCDS subframes. The SSS and the PSS are transmitted once within a duration of the UCDS. For example, the duration of the UCDS within a UCDS period is two subframes, or two subframes trigger to transmit the UCDS once, and the UCDS transmission symbols are: the symbol 4, the symbol 5, the symbol 6 and the symbol 7 in the first subframe, and a symbol 4 and a symbol 7 in a second subframe. Or, the PSS/SSS offsets a subframe, namely the symbol 4 and the symbol 7 in the first subframe, and the symbol 4, a symbol 5, a symbol 6 and the symbol 7 in the second subframe.

Figure 6:
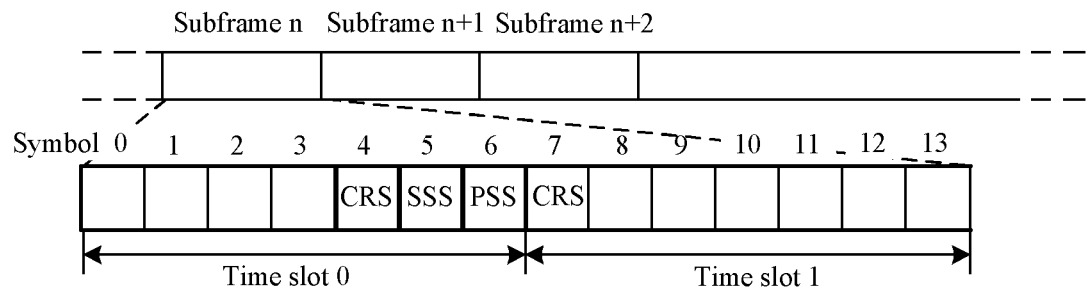
FIG. 6 is a position diagram of each signal of a UCDS in a time domain in Method Three according to an exemplary embodiment of the present disclosure.

FIG. 6 is a position diagram of each signal of a UCDS in a time domain in Method Three according to an exemplary embodiment of the present disclosure. FIG. 6 shows a transmission situation of the UCDS in a time domain.

Figure 7:
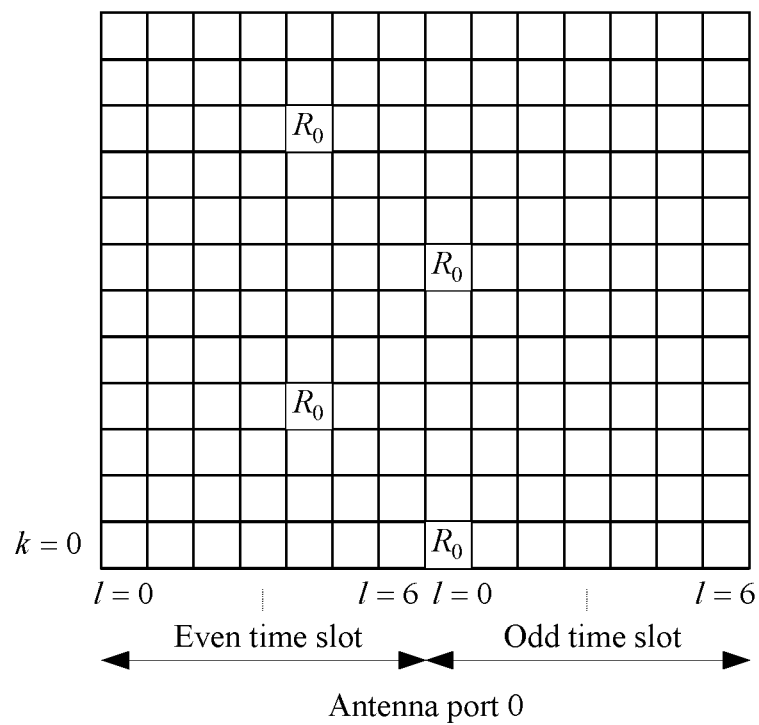
FIG. 7 is an RE position diagram of a CRS in Method Three according to an exemplary embodiment of the present disclosure.

FIG. 7 is an RE position diagram of a CRS in Method Three according to an exemplary Embodiment of the present disclosure. FIG. 7 shows a time-frequency domain position of the CRS in a subframe. The frequency domain position is offset. For example, in FIG. 7, an RE (k,l) for transmitting the CRS is (3,4), (9,4), (0,7) and (6,7). Certainly, three REs are offset in a frequency domain, namely (0,4), (6,4), (3,7) and (9,7). In addition, one, two or more REs are offset in the frequency domain.

Figure 8:
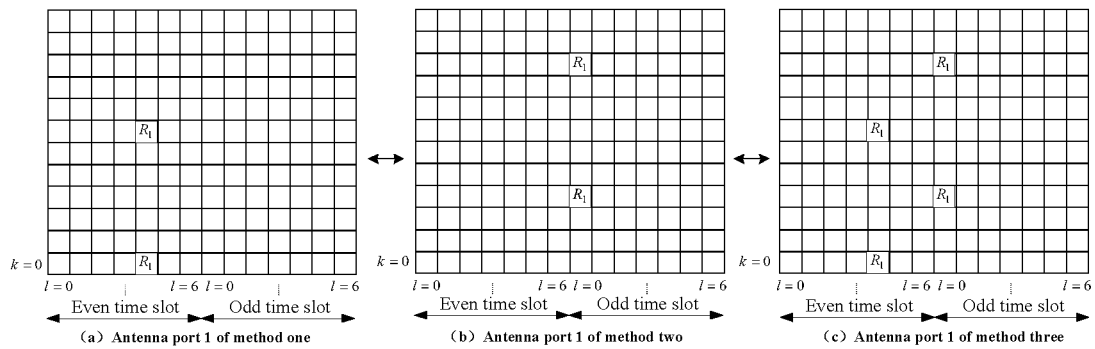
FIG. 8 is an RE position diagram of a CRS antenna port one according to an exemplary embodiment of the present disclosure.

It is important to note that the CRS is transmitted through a single port or is transmitted through two or more ports in the above three methods. An RE format about single-port transmission is as shown in FIG. 3, FIG. 5 and FIG. 7. FIG. 8 is an RE position diagram of a CRS antenna port one according to an exemplary embodiment of the present disclosure. FIG. 8 shows an RE format of a port 1, where RE formats of a port 0 in dual ports and a single port are identical. Herein, it is necessary to specially note that if the single port or the port 0 has RE offsets in the frequency domain as above, the port 1 has the same number of RE offsets on the basis of FIG. 8.

Exemplary Embodiment Two

In the exemplary embodiment, a UCDS includes a PSS, an SSS and a CRS. The PSS and the SSS are transmitted on non-adjacent symbols, and a CSI-RS is not configured to be transmitted. The exemplary embodiment includes the following methods.

Method One:

The SSS is transmitted on a symbol 13 in a first subframe, and the PSS is transmitted on a symbol 2 in a second subframe. The CRS is transmitted on a symbol 0 in the second subframe. That is, UCDS transmission symbols are the symbol 13 in the first subframe, and the symbol 0 and the symbol 2 in the second subframe.

Figure 9:
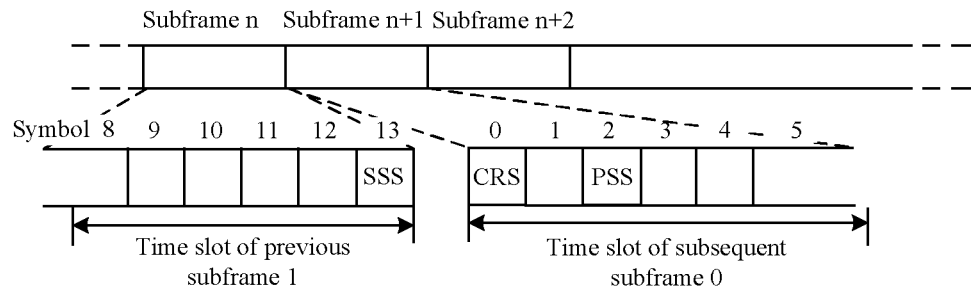
FIG. 9 is a position diagram of each signal of a UCDS in a time domain in Method One according to a second exemplary embodiment of the present disclosure.

FIG. 9 is a position diagram of each signal of a UCDS in a time domain in Method One according to a second exemplary embodiment of the present disclosure. FIG. 9 shows a transmission situation of the UCDS in a time domain.

Figure 10:
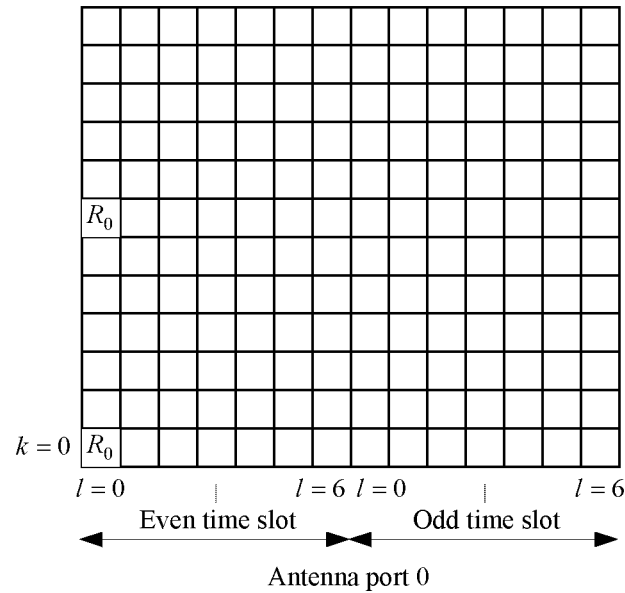
FIG. 10 is an RE position diagram of a CRS in Method One according to a second exemplary embodiment of the present disclosure.

FIG. 10 is an RE position diagram of a CRS in Method One according to a second exemplary embodiment of the present disclosure. FIG. 10 shows a time-frequency domain position of the CRS in a subframe. The frequency domain position is offset. For example, in FIG. 10, an RE (k,l) for transmitting the CRS is (0,0) and (6,0). Certainly, three REs are offset in a frequency domain, namely (3,0) and (9,0). In addition, one, two or more REs are offset in the frequency domain.

Method Two:

The SSS is transmitted on a symbol 13 in a first subframe, and the PSS is transmitted on a symbol 2 in a second subframe. The CRS is transmitted on a symbol 0 and a symbol 1 in the second subframe. That is, UCDS transmission symbols are the symbol 13 in the first subframe, and the symbol 0, the symbol 1 and the symbol 2 in the second subframe.

Figure 11:
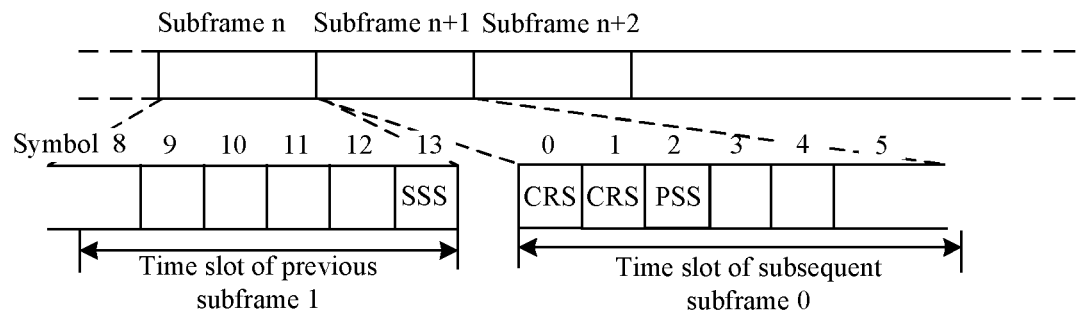
FIG. 11 is a position diagram of each signal of a UCDS in a time domain in Method Two according to a second exemplary embodiment of the present disclosure.

FIG. 11 is a position diagram of each signal of a UCDS in a time domain in Method Two according to a second exemplary embodiment of the present disclosure. FIG. 11 shows a transmission situation of the UCDS in a time domain.

Figure 12:
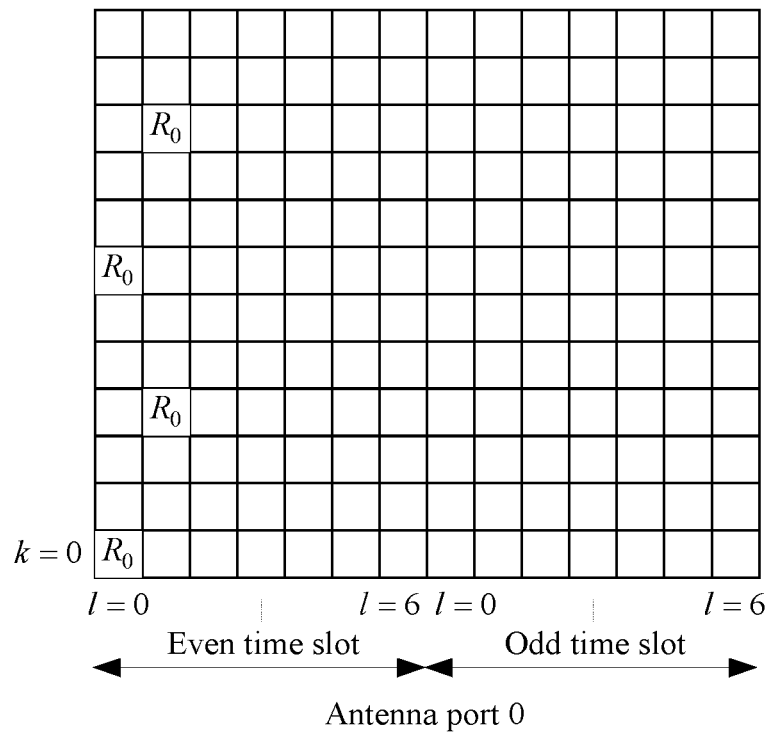
FIG. 12 is an RE position diagram of a CRS in Method Two according to a second exemplary embodiment of the present disclosure.

FIG. 12 is an RE position diagram of a CRS in Method Two according to a second exemplary embodiment of the present disclosure. FIG. 12 shows a time-frequency domain position of the CRS in a subframe. The frequency domain position is offset. For example, in FIG. 12, an RE (k,l) for transmitting the CRS is (0,0), (6,0), (3,1) and (9,1). Certainly, three REs are offset in a frequency domain, namely (3,0), (9,0), (0,1) and (6,1). In addition, one, two or more REs are offset in the frequency domain.

It is important to note that the CRS is transmitted through a single port or is transmitted through two or more ports in the above two methods. An RE format about single-port transmission is as shown in FIG. 10 and FIG. 12. RE formats of a port 0 in dual ports and a single port are identical, and an RE format of a port 1 offsets three REs in a frequency domain on the basis of the single port. Herein, it is necessary to specially note that if the single port or the port 0 has RE offsets in the frequency domain as above, the port 1 has the same number of RE offsets.

Exemplary Embodiment Three

In the exemplary embodiment, a UCDS includes a PSS, an SSS, a CRS and a CSI-RS. The PSS and the SSS are transmitted on adjacent symbols.

Transmission manners and time or frequency domain patterns of the PSS, the SSS and the CRS are consistent with various methods or similar methods introduced in Exemplary Embodiment One. The CSI-RS is transmitted according to a method specified in a 3GPP standard 36.211. That is, the UCDS includes: the PSS, the SSS, the CRS and the CSI-RS.

Or, in order to make a symbol of the CSI-RS in the UCDS adjacent or close to symbols of the PSS, the SSS and the CRS and to ensure no collision between all symbols in the UCDS, the following restraints are provided.

A base station does not transmit the CSI-RS at time domain positions of the PSS, the SSS and the CRS, or, a UE supposes that the CSI-RS does not exist at the time domain positions of the PSS, the SSS and the CRS in the UCDS.

For example, the SSS and the PSS are transmitted on a symbol 5 and a symbol 6 in subframes in Exemplary Embodiment One. If the CSI-RS is configured to be transmitted on the symbol 5 and the symbol 6 in the same subframe, collisions will be caused, so the base station does not transmit the CSI-RS in the subframe.

Or, if the symbol of the CSI-RS is overlapped with the symbols of the PSS, the SSS and the CRS caused by the configuration of the existing CSI-RS, the frequency domain positions of the PSS, the SSS and the CRS are avoided by changing the frequency domain position of the CSI-RS.

For example, the SSS and the PSS are transmitted on a symbol 5 and a symbol 6 in subframes in Exemplary Embodiment One. If the CSI-RS is configured to be transmitted on the symbol 5 and the symbol 6 in the same subframe, collisions will be caused. In this case, the CSI-RS is not transmitted on six RBs occupied by the SSS and the PSS, and the CSI-RS is transmitted on other frequency domain resources of the symbol 5 and the symbol 6.

Or, a subframe between the CSI-RS and the PSS/SSS/CRS is set to be offset, thus ensuring that different signals will not be transmitted on the same subframe symbol.

For example, an offset value between the CSI-RS and the SSS is set as n subframes, and it is necessary to inform the UE of the offset value.

Or, CSI-RS configurations in a 3GPP 36.211 Table 6.10.5.2-1 are limited, and a configuration format for making the symbol position of the CSI-RS adjacent or close to symbols occupied by other component signals in the UCDS in the existing configuration is retained.

Figure 13:
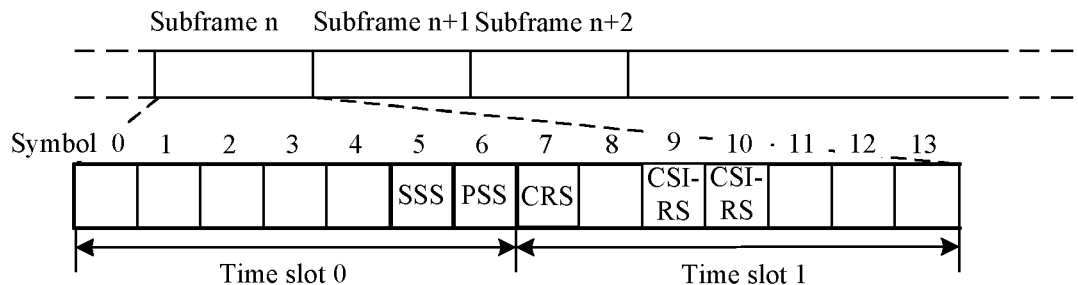
FIG. 13 is a position diagram of each signal of a UCDS in a time domain according to a third exemplary embodiment of the present disclosure.

For example, the CSI-RS configuration one in the Table 6.10.5.2-1 is adopted, and various methods or similar methods in Exemplary Embodiment One are combined. FIG. 13 is a position diagram of each signal of a UCDS in a time domain according to a third exemplary embodiment of the present disclosure. As shown in FIG. 13, a symbol 8 transmits the CSR or does not transmit the UCDS.

Or, the existing CSI-RS time domain configuration is modified to make the symbol position of the CSI-RS adjacent or close to symbols occupied by other component signals in the UCDS.

Figure 14:
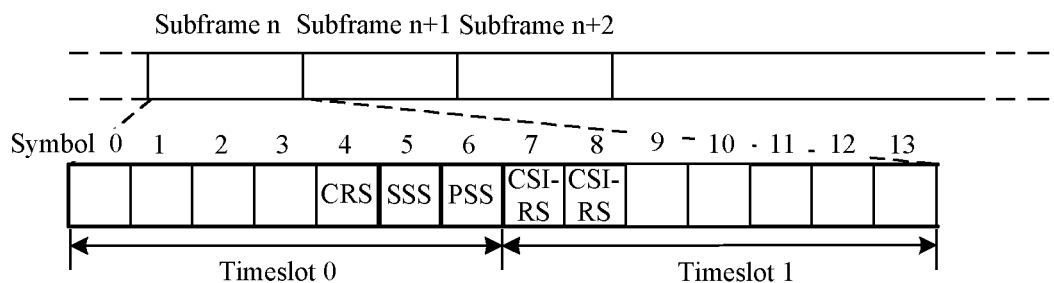
FIG. 14 is another position diagram of each signal of a UCDS in a time domain according to a third exemplary embodiment of the present disclosure.

For example, the CSI-RS configuration is modified to transmit on a symbol 0 and a symbol 1 of a time slot 1 (a symbol 7 and a symbol 8 in a subframe). FIG. 14 is another position diagram of each signal of a UCDS in a time domain according to a third exemplary embodiment of the present disclosure. As shown in FIG. 14, the UCDS occupies a symbol 4, a symbol 5, a symbol 6, a symbol 7 and a symbol 8. Certainly, the CSI-RS configuration is modified on the basis of FIG. 12, and the CSI-RS is transmitted on the symbol 8 and a symbol 9, namely the UCDS occupies the symbol 5, the symbol 6, the symbol 7, the symbol 8 and the symbol 9.

Exemplary Embodiment Four

In the exemplary embodiment, a UCDS includes a PSS, an SSS, a CRS and a CSI-RS. The PSS and the SSS are transmitted on non-adjacent symbols.

Transmission manners and time or frequency domain patterns of the PSS, the SSS and the CRS are consistent with various methods or similar methods introduced in Exemplary Embodiment Two. The CSI-RS is transmitted according to a method specified in a 3GPP standard 36.211. That is, the UCDS includes: the PSS, the SSS, the CRS and the CSI-RS.

Or, in order to make a symbol of the CSI-RS in the UCDS adjacent or close to symbols of the PSS, the SSS and the CRS and to ensure no collision between all symbols in the UCDS, the following restraints are provided.

A base station does not transmit the CSI-RS at time domain positions of the PSS, the SSS and the CRS, or, a UE supposes that the CSI-RS does not exist at the time domain positions of the PSS, the SSS and the CRS in the UCDS.

For example, the SSS and the PSS are transmitted on a symbol 13 (previous subframe) and a symbol 2 (subsequent subframe) in Exemplary Embodiment Two. If the CSI-RS is configured to be transmitted on the corresponding symbols in the two subframes or one of the symbols, collisions will be caused, so the base station does not transmit the CSI-RS in these subframes.

Or, if the symbol of the CSI-RS is overlapped with the symbols of the PSS, the SSS and the CRS caused by the configuration of the existing CSI-RS, the frequency domain positions of the PSS, the SSS and the CRS are avoided by changing the frequency domain position of the CSI-RS.

For example, the SSS and the PSS are transmitted on a symbol 13 (previous subframe) and a symbol 2 (subsequent subframe) in Exemplary Embodiment Two. If the CSI-RS is configured to be transmitted on the corresponding symbols in the two subframes, collisions will be caused. In this case, the CSI-RS is not transmitted on six RBs occupied by the SSS and the PSS, and the CSI-RS is transmitted on other frequency domain resources.

Or, a subframe between the CSI-RS and the PSS/SSS/CRS is set to be offset, thus ensuring that different signals will not be transmitted on the same subframe symbol.

For example, an offset value between the CSI-RS and the SSS is set as n subframes, and it is necessary to inform the UE of the offset value.

Or, CSI-RS configurations in a 3GPP 36.211 Table 6.10.5.2-1 are limited, and a configuration format for making the symbol position of the CSI-RS adjacent or close to symbols occupied by other component signals in the UCDS in the existing configuration is retained.

Or, the existing CSI-RS time domain configuration is modified to make the symbol position of the CSI-RS adjacent or close to symbols occupied by other component signals in the UCDS.

Figure 15:
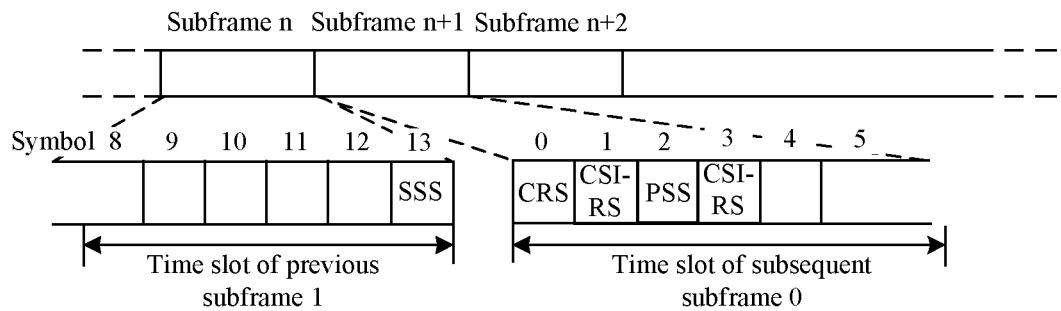
FIG. 15 is a position diagram of each signal of a UCDS in a time domain according to a fourth exemplary embodiment of the present disclosure.

For example, CSI-RS configurations 20 to 31 in the 3GPP 36.211 Table 6.10.5.2-1 are modified (applied to a time slot 1 in the related art), the modification is likewise applied to a situation of a time slot 0 (that is, ns mod 2=0), and the CSI-RS is transmitted on a symbol 1 and a symbol 3 of the time slot 0. FIG. 15 is a position diagram of each signal of a UCDS in a time domain according to a fourth exemplary embodiment of the present disclosure. As shown in FIG. 15, the UCDS occupies symbols 13, 0, 1, 2 and 3, where the symbol 13 is an SSS transmission symbol in the previous subframe, and the other symbols are located on the subsequent subframe. Other similar methods exist likewise, and will not be enumerated herein.

Exemplary Embodiment Five

Figures 16, 17:
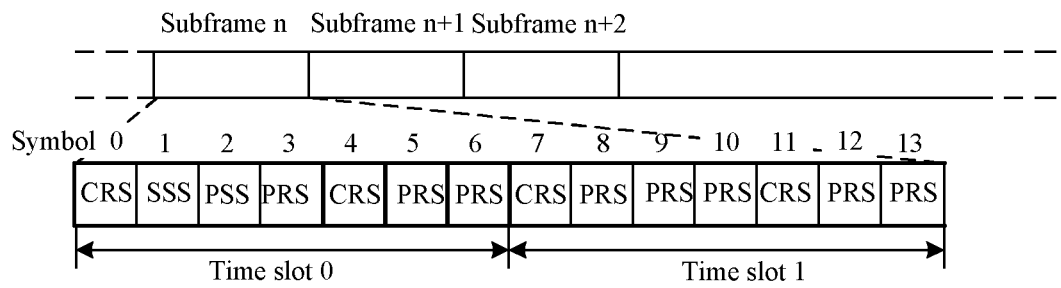
FIG. 16 is a position diagram of each signal of a UCDS in a time domain according to a fifth exemplary embodiment of the present disclosure.
FIG. 17 is a structural block diagram of a DS processing device according to an embodiment of the present disclosure.

In the exemplary embodiment, FIG. 16 is a position diagram of each signal of a UCDS in a time domain according to a fifth exemplary embodiment of the present disclosure. As shown in FIG. 16, a UCDS includes a PSS, an SSS, a CRS and a PRS. The PSS and the SSS are transmitted on non-adjacent symbols. Time domain resources occupied by the CRS and the PRS remain unchanged. That is, the CRS occupies symbols 0, 4, 7 and 11 in a subframe. The PRS occupies symbols 3, 5, 6, 8, 9, 10, 12 and 13 in the subframe. The SSS occupies a symbol 1. The PSS occupies a symbol 2.

Exemplary Embodiment Six

The exemplary embodiment mainly aims at the above-mentioned manner of transmitting a UCDS according to a periodic opportunity through LBT or CCA.

Firstly, the UCDS is transmitted according to a periodic opportunity. That is, the UCDS is transmitted according to a preset fixed period, offset, duration and burst. Preset transmission parameters include one or more of the above-mentioned multiple parameters. However, the UCDS is transmitted by satisfying a condition of successful LBT or CCA.

If an unlicensed carrier is obtained by contention, the UCDS is normally transmitted at a preset transmission time point (the preset time point refers to a period of time that is determined by the above-mentioned parameters such as the period and the offset and starts from a certain moment). And if the unlicensed carrier is not obtained by contention, the UCDS stops being transmitted once at the time point. Within a period of time before a next time point and after the current time point, if the unlicensed carrier is obtained by contention, the UCDS is continuously transmitted, but it is not required to necessarily transmit the UCDS at the preset time point. In other words, delayed transmission is performed, this transmission manner being irregular periodic transmission actually.

Similarly, the period of time is not necessarily limited to be after the preset time point, or is set to be before the preset time point or to include the preset time point. Meanwhile, the period of time and the preset time point are successive in a time domain or are, certainly, non-successive in the time domain.

To increase the transmission success rate of the UCDS and to ensure the measurement and synchronization performances, the following manners are adopted.

Manner One, a transmission period of the UCDS is shortened. For example, the existing DS period of a licensed carrier is 40 ms, 80 ms and 160 ms, and the transmission period of the UCDS is set as 10 ms, 20 ms or 40 ms. For example, if the transmission period of the UCDS is 10 ms, the probability of successfully transmitting the UCDS once will be greatly increased within a period of time (e.g., within 160 ms).

Manner Two, to increase the transmission success rate of the UCDS and to avoid UE detection from being too complicated, a UCDS transmission window is designed to increase a UCDS transmission opportunity. The UCDS transmission window is after or before a preset time point of the UCDS, and the UCDS transmission window includes the preset time point. Meanwhile, the UCDS transmission window and the preset time point are successive in a time domain or are non-successive in the time domain. In an exemplary embodiment, the UCDS transmission window is a period of successive time capable of transmitting the UCDS after a starting position of the preset time point, namely the UCDS transmission window duration includes the preset time point.

The UCDS transmission window is periodic, namely a UCDS transmission window exists in each UCDS period. If the UCDS does not contend for a resource at the preset time point, before a next preset time point, the UCDS continues attempting to transmit the UCDS within the UCDS transmission window after the current time point. If transmission succeeds, a next transmission opportunity is to occur at the next preset time point. If the resource is not obtained by contention within the UCDS transmission window, namely transmission of the UCDS fails within the UCDS transmission window, a next transmission opportunity occurs at the next preset time point.

Manner Three, to increase the transmission success rate of the UCDS and to avoid UE detection from being too complicated, dual-period setting is taken into consideration. A short period is set to attempt to complementarily transmit the UCDS beyond a preset long period. If transmission fails at a period point of the preset long period, the UCDS continues attempting to transmit the UCDS at a period point of the subsequent short period. If transmission succeeds at the period point of the preset long period, a next transmission opportunity is to occur at a period point of a next preset long period. That is, it is unnecessary to execute transmission attempting at the period point of the subsequent short period.

Specific examples are taken for the above-mentioned three transmission manners as follows.

It is supposed that the transmission period of the UCDS is 80 ms, the offset is 0 ms, the duration is 1 ms, and the burst is 1 (namely the UCDS is transmitted once within a period). Preset transmission parameters includes one or more of the above-mentioned multiple parameters. So, a possible transmission time point of the UCDS is a subframe 0, a subframe 80, a subframe 160 and the like.

Whether the UCDS is transmitted at these period points depends on a result of LBT or CCA. For example, if the UCDS contends for a right of use of an unlicensed carrier of the subframe 0, the UCDS is transmitted successfully. However, if the UCDS does not contend for the unlicensed carrier at the subframe 80, the base station cannot successfully transmit the UCDS at the subframe 80, and has to continue waiting for the next opportunity to contend for a resource of the subframe 160 to transmit the UCDS.

For Manner One, a shorter UCDS transmission period is designed. For example, the UCDS transmission period is 40 ms.

For Manner Two, a UCDS transmission window is designed as 20 ms, that is, a possible transmission time point of the UCDS is (0 ms-20 ms), (80 ms-100 ms), (160 ms-180 ms) and the like. The UCDS attempts to transmit the UCDS at a preset time point and within a time window. If the UCDS contends for a right of use of a resource of the subframe 0, the UCDS is transmitted successfully, and a next transmission opportunity of the UCDS is the subframe 80. If the UCDS does not contend for the subframe 80 to transmit the UCDS, LBT or CCA is continuously executed within (80 ms-100 ms) to attempt to transmit the UCDS.

For Manner Three, a short period of complementary transmission of the UCDS is designed as 10 ms. If the UCDS contends for a right of use of a resource of the subframe 0, the UCDS is transmitted successfully, and a next transmission opportunity of the UCDS is the subframe 80. If the UCDS does not contend for the subframe 80 to transmit the UCDS, subframes such as a subframe 90 and a subframe 100 are obtained by contention to transmit the UCDS. For example, if the UCDS contends for a right of use of the subframe 90, the UCDS is transmitted successfully, and a next transmission opportunity of the UCDS is the subframe 160.

The UCDS is transmitted according to frame alignment, subframe alignment or symbol alignment.

The UCDS is transmitted according to the frame alignment. For example, the UCDS is transmitted within the transmission window for Manner Two, if the base station does not contend for a resource at the current time point namely the subframe 80, the base station does not wait for a next preset time point namely the subframe 160, and continue contending for a right of use of the subframe 90 within the UCDS transmission window (80 ms-100 ms). If contention succeeds, the UCDS is transmitted at the subframe 90. The frame alignment is advantageous in that it is unnecessary to change the existing transmission time domain position of each component symbol in the UCDS. For example, the existing PSS/SSS is generally required to transmit FDD on the subframe 0 and the subframe 5. The frame alignment does not change the position of a subframe where they are transmitted. However, the frame alignment is disadvantageous in low attempting opportunity of UCDS transmission and high transmission probability.

The UCDS is transmitted according to the subframe alignment. For example, the UCDS is transmitted within the transmission window for Manner Two, if the base station does not contend for a resource at the current time point namely the subframe 80, the base station continues contend for subframes 81, 82, . . . , 99 to attempt to transmit the UCDS. This transmission manner involves the position of a subframe where the component signal is transmitted, but the position of a symbol in the subframe is not changed. The UCDS transmission opportunity of this manner is higher than that of the manner of transmitting the UCDS according to the frame alignment.

The UCDS is transmitted according to the symbol alignment. For example, the UCDS is transmitted within the transmission window for Manner Two, particularly LBE or similar manners, and the base station performs CCA at any time. If a resource is not obtained by contention at an initial moment of the subframe 80, CCA is continuously executed at the next moment to contend for the resource. If the resource is obtained by contention, the UCDS is transmitted according to the symbol alignment. This manner is most flexible, and the UCDS transmission opportunity is high than those of the above-mentioned two transmission manners. But, the existing symbol time domain position of each component signal in the UCDS is to be changed.

A non-integer symbol or an integer symbol (one or more) or a time difference of a sum of the integer symbol (one or more) and the non-integer symbol probably exists between a time point after LBT or CCA succeeds and a UCDS transmission time point. Within this period of time, a reserved signal is transmitted to retain a right of use of an unlicensed carrier. The reserved signal is a symbol or a symbol modification form of a signal/channel such as a CRS, a CSI-RS, a PSS/SSS, a PRS, a PDSCH, a Physical Downlink Control Channel (PDCCH), an SRS, a Physical Uplink Control Channel (PUCCH), and a UCDS. For example, the modification form is an SIB or DCI/UCI information, which carries a PLMN ID, carrier information (carrier number, carrier frequency, and carrier use situation), LBT parameters (e.g., whether to execute LBT, frame structure, and the like), and the length of the reserved signal.

The UCDS is transmitted at a preset time point (which is determined by one or more of parameters such as a preset period, offset, duration, burst, UCDS transmission window and complementary transmission short period). However, the successful position of LBT or CCA is not determined due to the specificity of an unlicensed carrier, so the successful position of LBT or CCA and a duration that is occupied have a cross relation and an inclusion relation with a UCDS transmission position and the duration. The UCDS is transmitted according to the following manners.

Manner One, after LBT or CCA succeeds, if a starting point (namely the successful position of LBT or CCA) at which the base station can transmit the UCDS is later than the preset time point of the UCDS, some UCDS symbols are transmitted (namely transmission of the UCDS is cut off according to a timing relation), or the UCDS is not immediately transmitted, a complete UCDS is transmitted according to the above-mentioned symbol alignment (or subframe alignment or frame alignment), and a space between the successful position of LBT or CCA and the UCDS transmission position transmits the above-mentioned reserved signal or some symbols of the UCDS.

Manner Two, after LBT or CCA succeeds, if a starting point at which the base station can transmit the UCDS is earlier than the preset time point of the UCDS, the space therebetween transmits the above-mentioned reserved signal or some symbols of the UCDS.

Manner Three, after LBT or CCA succeeds, if a duration within which the base station transmits the UCDS is greater than a single UCDS burst duration, and after transmission of a UCDS burst is ended, the UCDS, or some symbols of the UCDS, or a measurement signal, or control information is repeatedly transmitted, so as to satisfy the single-shot measurement performance of the UCDS.

FIG. 17 is a structural block diagram of a DS processing device according to an embodiment of the present disclosure. As shown in FIG. 17, the DS processing device includes: a processing component 10, configured to execute at least one of the following operations on each component signal of a DS: determining a configuration manner of each component signal; performing pattern modification on each component signal; and determining a transmission manner of each component signal or each pattern-modified component signal.

In an exemplary embodiment, the processing component 10 is configured to select and retain, according to an existing time-frequency resource position of each component signal of the DS, symbols, adjacent or close to each other in a time domain, in each component signal to form a UCDS and transmit the UCDS; or, modify a time-frequency resource position of each component signal to make a position of each component signal adjacent or close in a time domain, use modified symbols to form a UCDS, and transmit the UCDS.

By means of the device as shown in FIG. 17, the problems in the related art where there are many problems about application of a DS to an unlicensed carrier and it is necessary to re-design the DS are solved. Occupancy duration is shortened, and multi-interference to other devices is avoided.

In an exemplary embodiment, the UCDS includes, but not limited to, at least one of the following:
(1) a PSS;
(2) an SSS;
(3) a CRS;
(4) a CSI-RS; and
(5) a PRS,
and the PSS, the SSS, the CRS and the PRS are used for at least one of cell discovery and synchronization, and the CRS and the CSI-RS are used for at least one of Radio Resource Management (RRM) measurement and CSI measurement.

It is important to note that the component signals of the UCDS not only includes at least one of the above-mentioned signals, but also includes modification forms of the above-mentioned signals.

In an exemplary embodiment, the transmission manner includes, but not limited to, one of the following manners.

Manner One: periodic transmission, where the UCDS is transmitted according to a preset fixed period, offset, duration and burst.

Manner One is also divided into the following three manners.

(1) A UCDS is transmitted at each period point through an SCS no matter whether the period point has been occupied.

(2) If an unlicensed carrier is obtained by contention, the UCDS is normally transmitted at the period point. If the unlicensed carrier is not obtained by contention, the UCDS stops being transmitted once at the period point, waits for a next period point, and if a resource has not been obtained by contention yet at the next period point, the UCDS continuously stops being transmitted.

(3) If an unlicensed carrier is obtained by contention, the UCDS is normally transmitted at the period point. If the unlicensed carrier is not obtained by contention, the UCDS stops being transmitted once at the period point, and after the unlicensed carrier is obtained by contention next time, the UCDS is complementarily transmitted. But it is not required to necessarily transmit the UCDS at the period point, that is, complementary transmission is delayed transmission that is irregular periodic transmission actually.

The periodic transmission is to be determined by a licensed carrier (e.g., PCell) or other unlicensed carriers, or informs at least one of the SCell and UEs of UCDS transmission patterns of the SCells (including at least one of the following: period, offset, duration, port, power and burst), and the UE detects the UCDS according to the determined UCDS transmission pattern or measurement pattern (including at least one of the following: period, offset, duration, port, power and burst).

Manner Two: non-periodic trigger transmission, where the non-periodic trigger transmission of the UCDS is triggered by means of, for example, a PCell.

(1) The non-periodic trigger transmission includes: informing, by means of a licensed carrier such as a PCell or other unlicensed carriers, a UE of whether the SCell transmits at least one of the UCDS and configuration information of the UCDS.

(2) A trigger signal for triggering the SCell to transmit the UCDS is transmitted in a cable or radio manner between cells.

(3) When transmission of the UCDS is triggered, possible component signals of the UCDS have different functions, so transmission of a signal, multiple signals, or all signals of the possible component signals of the UCDS, or modification forms of the signals are triggered.

(4) By means of an RRC signaling, an MAC signaling or a physical layer signaling (e.g., DCI), the UE is informed of whether the SCell transmits at least one of the UCDS and configuration information of the UCDS.

(5) A time-frequency resource position of at least one of the trigger signal for triggering the SCell to transmit the UCDS and a signaling for informing the UE of whether the SCell transmits the UCDS is pre-configured or dynamically selected. Information such as a set period, subframe, symbol and RE are pre-configured. And at least one of the SCell and the UE is to detect at least one of the trigger signal and the signaling on these pre-configured points. At least one of the SCell and the UE performs blind detection during dynamic selection.

Manner Three: hybrid manner transmission, namely combination of the periodic transmission and the non-periodic trigger transmission. For example, sparse UCDS periodic transmission is performed through an SCS, after the SCell contends for a right of use of an unlicensed carrier, the PCell triggers the SCell to transmit the UCDS on the unlicensed carrier as needed.

During the hybrid manner transmission, it is likewise necessary to determine or inform the information of the above-mentioned two transmission manners. For example, at least one of the UE and the SCell is informed of information that includes a transmission pattern and measurement pattern of the UCDS and indicates whether to transmit the UCDS.

According to the transmission manners, the SCell transmits all component signals of the UCDS, or transmits one or more component signals in the UCDS. The reasons are that: requirements for the component signals of the UCDS are inconsistent due to different demands. For example, UCDSs on which a synchronization demand and an RRM measurement demand depend are different. It is necessary to adjust the UCDS transmission pattern of the SCell (including at least one of the following: period, duration and offset).

Therefore, all the component signals of the UCDS are independently configured, and are, certainly, configured in a combined manner.

If independent configuration is adopted, each component signal of the UCDS is independently configured with a period, an offset, duration, a subframe position, and a time-frequency pattern. All the component signals are restrained.

In a exemplary implementation process, periods of all the signals are defined by a relation. For example, configuration periods of different signals have a multiple relation. For example, the UCDS includes a PSS, an SSS, a CRS and a CSI-RS, which are independently configurable. A CRS period is a multiple of a PSS/SSS period; or, the PSS/SSS period is a multiple of the CRS period; or, a CSI-RS period is a multiple of the CRS period; or, the CRS period is a multiple of the CSI-RS period; or, the CSI-RS period is a multiple of the PSS/SSS period; or, the PSS/SSS period is a multiple of the CSI-RS period.

In an exemplary implementation process, subframe positions of all the signals are defined by a relation. For example, it is restrained that the CRS is located on a subframe for transmitting the PSS/SSS, or the CRS is located on a subframe for transmitting the CSI-RS, or, the CSI-RS is located on a subframe for transmitting the PSS/SSS.

If the combined configuration is adopted, the UCDS is configured with a unified period, offset, duration, burst and the like. Under the above-mentioned unified configuration, each component signal of the UCDS has at least one of different subframe positions and time-frequency configurations such as subframe, symbol and RE. The period of the UCDS (e.g., including the PSS, the SSS, the CRS, the CSI-RS, and other configurable or non-configurable signals) is configured as 40 ms, 80 ms and 160 ms. The duration is configured as one to five subframes. Within each duration of each period, each component signal of the UCDS has different configurations or subframe information. For example, the PSS/SSS is transmitted once, the CRS is transmitted for many times, the CSI-RS and the PSS/SSS have a subframe or symbol offset relation, and subframe or symbol information of each component signal is provided.

Hereinafter, a UCDS subframe is defined as a UCDS transmitting subframe or a subframe that the UE supposes existence of the UCDS. The UCDS subframe includes one, two or more subframes. According to the above-mentioned UCDS transmission manners, the UCDS subframe is a periodic subframe, a non-periodic subframe or a combined subframe.

From the above description, it can be seen that the above-mentioned embodiments achieve the following technical effects (it is important to note that these effects are effects that can be achieved by some exemplary embodiments): by means of the technical solution provided in the embodiment of the present disclosure, the problem in the related art where there are many problems about application of a DS to an unlicensed carrier and it is necessary to re-design the DS are solved, an occupancy duration is shortened, and multi-interference to other devices is avoided.

Obviously, a person skilled in the art should understand that all of the above-mentioned components or steps in the present disclosure are implemented by using a general calculation device, are centralized on a single calculation device or are distributed on a network composed of multiple calculation devices. Alternatively, they are implemented by using executable program codes of the calculation devices. Thus, they are stored in a storage device and executed by the calculation devices, the shown or described steps are executed in a sequence different from this sequence under certain conditions, or they are manufactured into each integrated circuit component respectively, or multiple components or steps therein are manufactured into a single integrated circuit component. Thus, the present disclosure is not limited to a combination of any specific hardware and software.

The above are the exemplary embodiments of the present disclosure, and not intended to limit the present disclosure. As will occur to a person skilled in the art, the present disclosure is susceptible to various modifications and changes. Any modifications, equivalent replacements, improvements and the like made within the scope as claimed in claims of the present disclosure should fall within the scope of protection of the present disclosure.

INDUSTRIAL APPLICABILITY

As above, the DS processing method and device provided in the embodiment of the present disclosure have the following beneficial effects: re-design of a DS is avoided, occupancy duration is shortened, and multi-interference to other devices is avoided.

What is claimed is:
1. A Unlicensed Carrier Discovery Signal (UCDS) processing method, comprising:
 sending a UCDS according to a transmission manner;
 wherein the UCDS comprises at least one of the following:
  a Primary Synchronization Signal (PSS);
  a Secondary Synchronization Signal (SSS);
  a Cell-specific Reference Signal (CRS);
  a Channel State Information-Reference Signal (CSI-RS); and
 wherein the PSS, the SSS, the CRS are used for at least one of cell discovery and synchronization, and the CRS and the CSI-RS are used for at least one of Radio Resource Management (RRM) measurement and CSI measurement;
wherein above composition signals in the UCDS need to satisfy the following:
CSI-RS is adjacent or close to symbols of PSS, SSS in the UCDS;
CSI-RS is not transmitted in a time domain position of PSS or SSS in the UCDS;
the PSS and the SSS are transmitted on adjacent symbols in the UCDS;
wherein the transmission manner for transmitting UCDS comprises one of the following: frame alignment, subframe alignment or symbol alignment;
wherein the transmission manner of subframe alignment means that: the UCDS is transmitted within a transmission window, if the base station fails to contend for a resource at the current subframe in the window, it can continue contend for one or more remaining subframes in the window to transmit the UCDS.

2. The method as claimed in claim 1, wherein when the UCDS configured with CSI-RS, a time domain position of the CSI-RS is defined in a preset position;
or the transmission manner comprises one of the following: periodic transmission; non-periodic trigger transmission; and hybrid manner transmission of the periodic transmission and the non-periodic trigger transmission.

3. The method as claimed in claim 2, wherein the CSI-RS in the UCDS is transmitted by configuration corresponding to symbol 9 and symbol 10.

4. The method as claimed in claim 2, wherein the periodic transmission comprises one of the following:
transmitting a UCDS at each period point through a Short Control Signaling (SCS);
when an unlicensed carrier is obtained by contention, normally transmitting the UCDS at a current period point, when the unlicensed carrier is not obtained by contention, stopping transmitting the UCDS once at the current period point, waiting for a next period point, and when the unlicensed carrier has not been obtained by contention yet at the next period point, continuously stopping transmitting the UCDS once; and
when an unlicensed carrier is obtained by contention, normally transmitting the UCDS at a current period point, when the unlicensed carrier is not obtained by contention, stopping transmitting the UCDS once at the current period point, and after the unlicensed carrier is obtained by contention next time, complementarily transmitting the UCDS, wherein complementary transmission of the UCDS is irregular periodic transmission;
or the periodic transmission comprises one of the following: transmitting the UCDS by means of Listen before Talk (LBT) or Clear Channel Assessment (CCA) according to a preset transmission parameter set, wherein the preset transmission parameter set comprises at least one of the following: a period, an offset, a duration and a burst; and when an unlicensed carrier is obtained by contention, transmitting the UCDS at a current period point, when the unlicensed carrier is not obtained by contention, stopping transmitting the UCDS once at the current period point, and when an unlicensed carrier is re-obtained by contention within a time period before a next period point, continue to transmit the UCDS, wherein continued transmission of the UCDS is irregular periodic transmission, the next period point is after the current period point, the current period point and the next period point are determined by a preset transmission parameter set, and the preset transmission parameter set comprises at least one of the following: a period, an offset, a duration and a burst;
or the non-periodic trigger transmission comprises: informing, by means of a licensed carrier or an unlicensed carrier, a User Equipment (UE) and a Secondary Cell (SCell) corresponding to the UE of whether to transmit at least one of the UCDS and configuration information of the UCDS.

5. The method as claimed in claim 4, wherein a trigger signal for triggering the SCell to transmit the UCDS is transmitted in a cable or radio manner between different cells;
or by means of a Radio Resource Control (RRC) signaling, a Media Access Control (MAC) signaling or a physical layer signaling, the UE is informed of whether the SCell transmits at least one of the UCDS and the configuration information of the UCDS;
or a time-frequency resource position of at least one of the trigger signal for triggering the SCell to transmit the UCDS and a signaling for informing the UE of whether the SCell transmits the UCDS is pre-configured or dynamically selected.

6. The method as claimed in claim 1, wherein a transmission policy of the UCDS comprises one of the following:
shortening a transmission period of the UCDS;
increasing a transmission opportunity of the UCDS by using a transmission window, wherein a design manner of the transmission window comprises one of the following: the transmission window is before a preset time point, the transmission window is after the preset time point, the transmission window contains the preset time point, the preset time point is determined by a preset transmission parameter set, and the preset transmission parameter set comprises at least one of the following: a period, an offset, a duration and a burst; and
cooperatively transmitting the UCDS by using a first period and a second period, wherein the first period is greater than the second period, and the UCDS is complementarily transmitted within the second period when the UCDS is not successfully transmitted within the first period.

7. The method as claimed in claim 6, wherein when the transmission opportunity of the UCDS is increased by using the transmission window, the transmission window is determined by a base station and transmitted to a terminal by the base station; or, when the UCDS is cooperatively transmitted by using the first period and the second period, the first period and the second period are determined by a base station and transmitted to a terminal by the base station.

8. The method as claimed in claim 1, wherein the configuration manner comprises one of the following: an independent configuration manner and a combined configuration manner.

9. The method as claimed in claim 8, wherein when each component signal adopts the independent configuration manner, each component signal is independently configured with at least one of a period, an offset, a duration, a subframe position, a time-frequency pattern, and a burst;
or each component signal is configured with at least one of a unified period, offset, duration and burst, each component signal having at least one of different subframe positions and time-frequency configurations.

10. The method as claimed in claim 9, wherein periods of all the component signals are defined by a preset relation;

or subframe positions of all the component signals are defined by a preset relation.

11. The method as claimed in claim 1, wherein a UCDS subframe is at least one of a periodic subframe and a non-periodic subframe, wherein the UCDS subframe is a UCDS transmitting subframe or a subframe that the UE supposes existence of the UCDS;
or the UCDS satisfies a single-shot RRM measurement performance of a Licensed Assisted Access (LAA).

12. The method as claimed in claim 11, wherein a condition that the UCDS satisfies the single-shot RRM measurement performance of the LAA comprises one of the following:
transmitting at least one UCDS bursts within a UCDS transmitting period, wherein a plurality of UCDS bursts are transmitted in a successive manner or a non-successive repeated manner on a time domain; and
transmitting a measurement signal or symbol on non-successive symbols in the UCDS.

* * * * *